US011755511B2

(12) United States Patent
Srinivasan et al.

(10) Patent No.: US 11,755,511 B2
(45) Date of Patent: Sep. 12, 2023

(54) DATA BUS INVERSION USING MULTIPLE TRANSFORMS

(71) Applicant: XILINX, INC., San Jose, CA (US)

(72) Inventors: Krishnan Srinivasan, San Jose, CA (US); Sagheer Ahmad, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/411,891

(22) Filed: Aug. 25, 2021

(65) Prior Publication Data

US 2023/0069505 A1 Mar. 2, 2023

(51) Int. Cl.
*G06F 13/20* (2006.01)
*G06F 9/445* (2018.01)

(52) U.S. Cl.
CPC .......... *G06F 13/20* (2013.01); *G06F 9/44505* (2013.01)

(58) Field of Classification Search
CPC .............................. G06F 13/20; G06F 9/44505
USPC ....................... 710/30, 33, 51, 104
See application file for complete search history.

(56) References Cited

U.S. PATENT DOCUMENTS

| 5,818,784 | A * | 10/1998 | Muranaka | G11C 7/1051 |
| | | | | 365/230.01 |
| 6,418,059 | B1 * | 7/2002 | Kreifels | G11C 16/10 |
| | | | | 365/230.09 |
| 7,571,204 | B1 * | 8/2009 | Ballachino | G06F 7/50 |
| | | | | 708/714 |
| 2003/0126175 | A1 * | 7/2003 | Kurd | G06F 7/5525 |
| | | | | 708/504 |
| 2003/0184454 | A1 * | 10/2003 | Okamura | H03M 7/14 |
| | | | | 341/58 |
| 2004/0003336 | A1 * | 1/2004 | Cypher | G11C 29/42 |
| | | | | 714/763 |
| 2004/0095108 | A1 * | 5/2004 | Kernahan | H03K 19/0963 |
| | | | | 323/282 |
| 2005/0088904 | A1 * | 4/2005 | Jain | G11C 15/00 |
| | | | | 365/232 |

(Continued)

OTHER PUBLICATIONS

Mittal, Sparsh, et al., "A survey of encoding techniques for reducing data-movement energy" Journal of Systems Architecture, vol. 97, Nov. 6, 2018.

(Continued)

*Primary Examiner* — Farley Abad
*Assistant Examiner* — Henry W Yu
(74) *Attorney, Agent, or Firm* — Patterson + Sheridan, LLP (57) ABSTRACT

Transmitter circuitry includes inversion circuitry, first transform circuitry, and selection circuitry. The inversion circuitry generates a first transformed data word by inverting one or more of a plurality of bits of a first data word. The first transform circuitry generates a second transformed data word by performing a first invertible operation on the first data word and a second data word. The selection circuitry selects one of the first data word, the first transformed data word, and the second transformed data word based on a first number of bit inversions between the first data word and the second data word, a second number of bit inversions between the first transformed data word and the second data word, and a third number of bit inversions between the second transformed data word and the second data word. The selection circuitry further outputs the selected data word.

20 Claims, 5 Drawing Sheets

(56) References Cited

U.S. PATENT DOCUMENTS

| | | | |
|---|---|---|---|
| 2006/0125549 A1* | 6/2006 | Kawamata | G11C 29/787 |
| | | | 257/E23.149 |
| 2006/0156212 A1* | 7/2006 | Kikutake | G11C 29/42 |
| | | | 714/800 |
| 2007/0266286 A1* | 11/2007 | Tseng | G01R 31/31727 |
| | | | 714/731 |
| 2009/0172496 A1* | 7/2009 | Roine | H03M 13/19 |
| | | | 711/E12.001 |
| 2011/0084737 A1* | 4/2011 | Oh | H04L 25/4915 |
| | | | 327/108 |
| 2013/0082735 A1* | 4/2013 | Nakamura | H03K 19/215 |
| | | | 326/55 |
| 2018/0357188 A1 | 12/2018 | Brief | |
| 2021/0099252 A1* | 4/2021 | Savoj | G06F 13/4086 |

OTHER PUBLICATIONS

Xie, Chen, et al., ACME: An Energy-Efficient Approximate Bus Encoding for I2C, Proceedings of the ACM/IEEE International Symposium on Low Power Electronics and Design, Jul. 26, 2021.

Lucas, J. et al. "Optimal DC/AC data bus inversion coding." 2018 Design, Automation & Test in Europe Conference & Exhibition, 2018, 7 pages.

* cited by examiner

DATA BUS INVERSION USING MULTIPLE TRANSFORMS

TECHNICAL FIELD

Examples of the present disclosure generally relate to interface systems, and, more particularly, interface systems that employ data bus inversion techniques that include multiple transforms.

BACKGROUND

Interface systems are used to communicate between integrated circuit (IC) devices or within IC devices. For example, an interface system may be a chip-to-chip (C2C) interface that communicates between a multiple IC chips. In another example, the interface system is a Network-on-Chip (NOC). The size of the interface systems is limited based on the available space within the corresponding IC chips, and as the size of the IC chips decreases, the available space for the interface systems decreases, limiting the size of the interface systems. Limiting the size of the interface systems, limits the number of traces (e.g., wires) forming the channels of the interface systems. Accordingly, to reach higher bandwidths, the interface systems are operated at higher data rates. However, as the data rate increases the potential for errors increases, decreasing the signal integrity.

To achieve a high signal integrity when operating at higher data rates, bit error rates (BER) are maintained at lower rates. One contributor to the BER is the number of bit inversions that occur between a current data word and a previously transmitted data word. To reduce the number of bit inversions that occur between a current data word and a previously transmitted data word, the bits of the current data word are inverted (e.g., toggled between values). In some examples, a technique such as Data Bus Inversion (DBI) is used to reduce the number of bit inversions between a transmitted data word and the previously transmitted data word. The DBI technique includes transforming a data word and transmitting one of the data word and the transformed data word based on the number bit transitions of the data word and the transformed data word as compared to the previous data word.

Even when employing the DBI technique, as the size of the interface systems decreases and/or the data rate of the interface systems increases, the BER of the interface system may increase beyond the mitigation capabilities of the current DBI techniques. Accordingly, there is a need to further reduce the number of bit inversions between data words to further reduce the BER of an interface system, further reducing errors that occur when communicating between IC chips.

SUMMARY

Interface systems between integrated circuit (IC) devices limit the number of bit inversions between a current data word and a previously transmitted data word to mitigate errors within and the bit error rate of the interface system. In one example, the interface is a chip-to-chip (C2C) interface or a Network-on-Chip (NOC), among others. Limiting the number of bit inversions between the bits of a current data word and the bits of a previously transmitted data word includes applying one or more invertible operations to the current and previously transmitted data words. In one example, the one or more invertible operations include a bitwise XOR operation, or a bitwise XNOR operation, among others. The invertible operation is applied to the current data word and the previous data word to generate a transformed data word. The data word (e.g., transformed or non-transformed data word) having the smallest number of bit inversions from the previous data word is selected and transmitted.

In one example, transmitter circuitry includes inversion circuitry, first transform circuitry, and selection circuitry. The inversion circuitry generates a first transformed data word by inverting one or more of the plurality of bits of a first data word. The first transform circuitry generates a second transformed data word by performing a first invertible operation on the first data word and a second data word. The selection circuitry selects one of the first data word, the first transformed data word, and the second transformed data word based on a first number of bit inversions between the first data word and the second data word, a second number of bit inversions between the first transformed data word and the second data word, and a third number of bit inversions between the second transformed data word and the second data word. The selection circuitry further outputs the selected data word.

In one example, an electronic device includes transmitter circuitry. The transmitter circuitry includes processing circuitry and selection circuitry. The processing circuitry receives a first data word having a plurality of bits, and generates a first transformed data word by inverting one or more of the plurality of bits of the first data word. The processing circuitry further generates a second transformed data word by performing a first invertible operation on the first data word and a second data word. The selection circuitry selects one of the first data word, the first transformed data word, and the second transformed data word based on a first number of bit inversions between the first data word and the second data word, a second number of bit inversions between the first transformed data word and the second data word, and a third number of bit inversions between the second transformed data word and the second data word. The transmitter circuitry outputs the selected data word.

In one example, a method transmitting a data word includes receiving a first data word having a plurality of bits, and generating a first transformed data word by inverting one or more of the plurality of bits of the first data word. The method further includes generating a second transformed data word by performing a first invertible operation on the first data word and a second data word. Further, the method includes selecting one of the first data word, the first transformed data word, and the second transformed data word based on a first number of bit inversions between the first data word and the second data word, a second number of bit inversions between the first transformed data word and the second data word, and a third number of bit inversions between the second transformed data word and the second data word. Additionally, the method includes outputting the selected data word.

These and other aspects may be understood with reference to the following detailed description.

BRIEF DESCRIPTION OF THE DRAWINGS

So that the manner in which the above-recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Interface systems are used to communicate data words between integrated circuit (IC) devices. Example interfaces include chip-to-chip (C2C) interfaces and Network-on-Chip (NOC) interfaces. To reduce the error rate of the interface system, the interface system reduces the number of bits that toggle (e.g., invert) between the current data word and a previously transmitted data word. In one example, to reduce the number of bit inversions when transmitting a data word, the data word is inverted before being transmitted as the transformed data word may have less bit inversions than the non-transformed data word. In one example, if the number of bit inversions between the current data word and a previous data word is less than 50 percent of the total number of bits in a data word, the current data word is not inverted before transmission. If the number of bits inversions between the current data word and the previous data is greater than 50 percent of the total number of bits in a data word, the current data word is inverted before being transmitted.

However, in some instances, even with the application of the above methods, the error rate of an interface system increases due to the reduced circuit size available to the interface systems and the use of higher data rates. To further reduce the number of bits inversions between transmissions, additional operations are applied to the current and previously transmitted data word. For example, one or more invertible operations are applied to the current and previous data word to generate a corresponding transformed data word. In one example, the one or more invertible operations include a bitwise XOR operation, and a bitwise XNOR operation, among others. The use of an invertible operation to generate a transformed data word for transmission reduces the number of inversions in low efficiency cases. For example, a low efficiency case may exist when a total number of inversions between the current data word and the previous data word is one more or one less than half of (e.g., close to 50 percent) the total number of bits within the data word. Reducing the number of inversions in such cases further reduces the error rate of the corresponding interface system.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Figure 1:
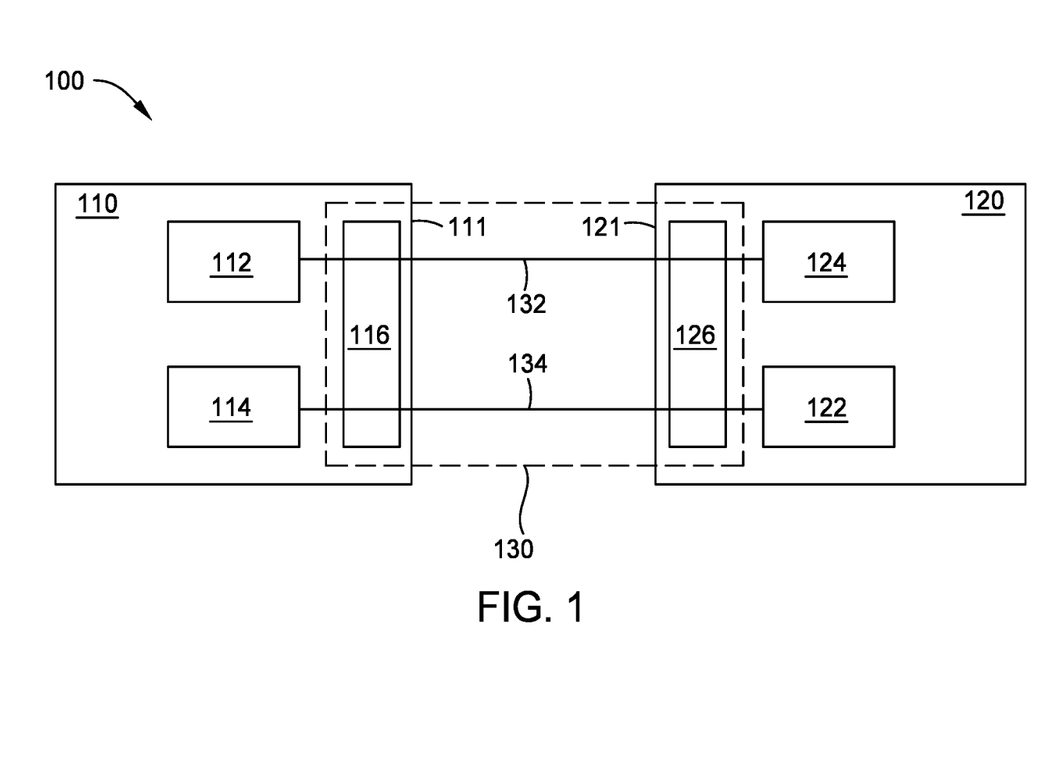
FIG. 1 is a block diagram depicting an example electronic device, according to an example.

FIG. 1 illustrates an example electronic device 100, according to one or more examples. The electronic device 100 includes a main (anchor) IC chip 110, an auxiliary IC chip 120, and an interface 130. The main IC chip 110 is connected to one or more auxiliary IC chips (chiplets) 120, forming a multi-chip system. The main IC chip 110 includes circuit blocks, such as power supply controllers and memory controllers, among others. The auxiliary IC chip 120 may be a hardware accelerator, artificial intelligence (AI) engine, and/or a transceiver engine, among others. The use of the auxiliary IC chip 120 with a main IC chip 110 de-couples the development cycle of the main IC chip 110 from the auxiliary IC chips 120. Further, the use of a main IC chip 110 with auxiliary chips 120 allows for different types auxiliary chips to be used with a main chip in different configurations.

The interface 130 communicates data between the main IC chip 110 and the auxiliary IC chip 120. The interface 130 includes channels 132 and 134 that couple the main IC chip 110 with the auxiliary IC chip 120. The interface 130 is a C2C interface system within a multi-chip system.

The main IC chip 110 is an application specific IC (ASIC) or a programmable IC (e.g., a field programmable gate array (FPGA)). The main IC chip 110 includes transmitter circuitry 112, receiver circuitry 114, and interface circuitry 116. The transmitter circuitry 112, the receiver circuitry 114, and the interface circuitry 116 form a serializer/deserializer (SerDes) device within the main IC chip 110 or another type of transceiver. The main IC chip 110 may further include parallel-in-serial-out (PISO) circuitry, serial-in-parallel-out (SIPO) circuitry and other circuit elements (e.g., encoder circuitry and/or decoder circuitry, among others). The PISO circuitry converts parallel input data to serial output data for transmission by the transmitter circuitry 112 via the interface circuitry 116 over the channel 132. The receiver circuitry 114 receives a data word via the interface circuitry 116 over the channel 134. The receiver circuitry 114 processes the data word to generate a received signal. The SIPO circuitry converts serial input data received by the receiver circuitry 114 to parallel output data.

The auxiliary IC chip 120 is an ASIC or a programmable IC. The auxiliary IC chip 120 includes transmitter circuitry 122, receiver circuitry 124, and interface circuitry 126. The transmitter circuitry 122, the receiver circuitry 124, and the interface circuitry 126 form a SerDes device or another type of transceiver circuitry. The auxiliary IC chip 120 may further include PISO circuitry, SIPO circuitry, and other circuit elements (e.g., encoder circuitry and/or decoder circuitry, among others). The PISO circuitry converts parallel input data to serial output data for transmission by the transmitter circuitry 122 via the interface circuitry 126 over the channel 134. The receiver circuitry 124 receives a data word via the interface circuitry 126 over the channel 132. The receiver circuitry 114 processes the data word to generate a received signal. The SIPO circuitry converts serial input data received by the receiver circuitry 124 to parallel output data.

The channels 132 and 134 include one or more parallel traces (wires) coupling the interface circuitry 116 and the interface circuitry 126. The number of the traces within the channels 132 and 134 corresponds to the circuit area size of the interface circuitry 116 and the interface circuitry 126. In one example, the circuit area available to the interface circuitry 116 corresponds to the available circuit area of the main IC chip 110 along the edge 111 of the main IC chip 110. Further, the circuit area available to the interface circuitry 126 corresponds to the available circuitry area of the auxiliary IC chip 120 along the edge 121 of the auxiliary IC chip 120. Accordingly, the circuit area of the interface circuitry 116 and interface circuitry 126 is limited to the available circuit size in the main IC chip and the auxiliary IC chip 120, limiting the number of traces (e.g., wires) that form the channels 132 and 134. Accordingly, to reach higher bandwidths, the interface circuitry 116 and the interface circuitry 126 are operated at higher data rates. However, operating at higher data rates increases the corresponding bit error rate (BER). In one example, the interface circuitry 116 and the interface circuitry 126 support 42 traces per data word and are operated at about 8 Gbps per trace to achieve a data rate of about 328 Gbps. The data rate corresponds to the number of traces per data word and the data rate per trace.

To achieve a high signal integrity when operating at high data rates, bit error rate (BER) is reduced. One contributor to the BER is the number of bit inversions between a current data word and a previously transmitted data word (e.g., a previous data word) completed by interface circuitry 116 and the interface circuitry 126 when transferring a data word. As the number of inversions completed by the interface circuitry 116 and the interface circuitry 126 increases, the likelihood of error in the transmission increases. In one example, a Data Bus Inversion (DBI) technique (process) is used to reduce bit inversions at the interface circuitry 116 and the interface circuitry 126. In one example, when performing DBI, the bits of a current data word is compared to the bits of the previous data word. The previous data word is the data word transmitted immediately before the current data word. Stated another way, the current data word is subsequent to the previous data word. The bits of each data word are compared to each other to determine a first number of bit transitions between the data words. A bit transition occurs when the value of bit of a current data word differs from the value of a corresponding bit of the previous data word. In one example, the current data word is 111010000, and the previous data word is 000010000. In such an example, the first three bits of the current data word differ from those of the previous data word. Accordingly, three bits toggle (e.g., three bit inversions occur) between the current and previous data words. In another example, the bits of the current data word are 010011111 and the bits of a previous data word are 000010000. In such an example, the second bit and last four bits of the current data word differ from the previous data word, totaling five bits that differ between the current data word and the previous data word. Accordingly, five bits toggle, or five bits are inverted, between the current data word and the previous data word.

As the number of bits that toggle between the current word and previous word increase, the BER increases. In one example, to reduce the number of bits that that toggle between the current and word and the previous word, the bits of the current data word are inverted. The transformed data word is compared to the previous data word to determine if the number of bits that toggle between the transformed data word and the previous data word is greater than or less than the number of bits that toggle between the current data word (non-transformed data word) and the previous data word. If the number of bits that toggle between the inverted data and previous data word is less than that of the number of bits that toggle between the current data and previous data word, the transformed data word is transmitted.

Based on the above example, the current data word of 010011111 is inverted to transformed data word of 101100000. As compared previous data word 000010000, the transformed data word differs by four bits, which is less than that of the current (non-inverted) data word that differs from the previous data word by five bits. Accordingly, the transformed data word is selected and transmitted. In one example, if more than half of the bits toggle (e.g., are inverted) between the current data word and the previous data word, the bits of the current data word are inverted.

The transmitter circuitry 112 inverts (e.g., toggles) the bits of a current data word before transmitting the transformed data word via the interface circuitry 116 and the channel 132 to the interface circuitry 126 and the receiver circuitry 124 of the auxiliary IC chip 120. Further, the transmitter circuitry 112 determines whether to transmit the current data word in a non-inverted form or the transformed data word as is described above. The transformed data word or non-inverted current data word is received by the receiver circuitry 124 of the auxiliary IC chip 120 via the interface circuitry 126 and the channel 132. The receiver circuitry 124 also receives an indication signal via the channel 132 and the interface circuitry 126. The indication signal indicates whether the transmitted data word is inverted or not. The receiver circuitry 124 inverts and processes the received data word or processes the received data word based on the indication signal.

Figure 2:
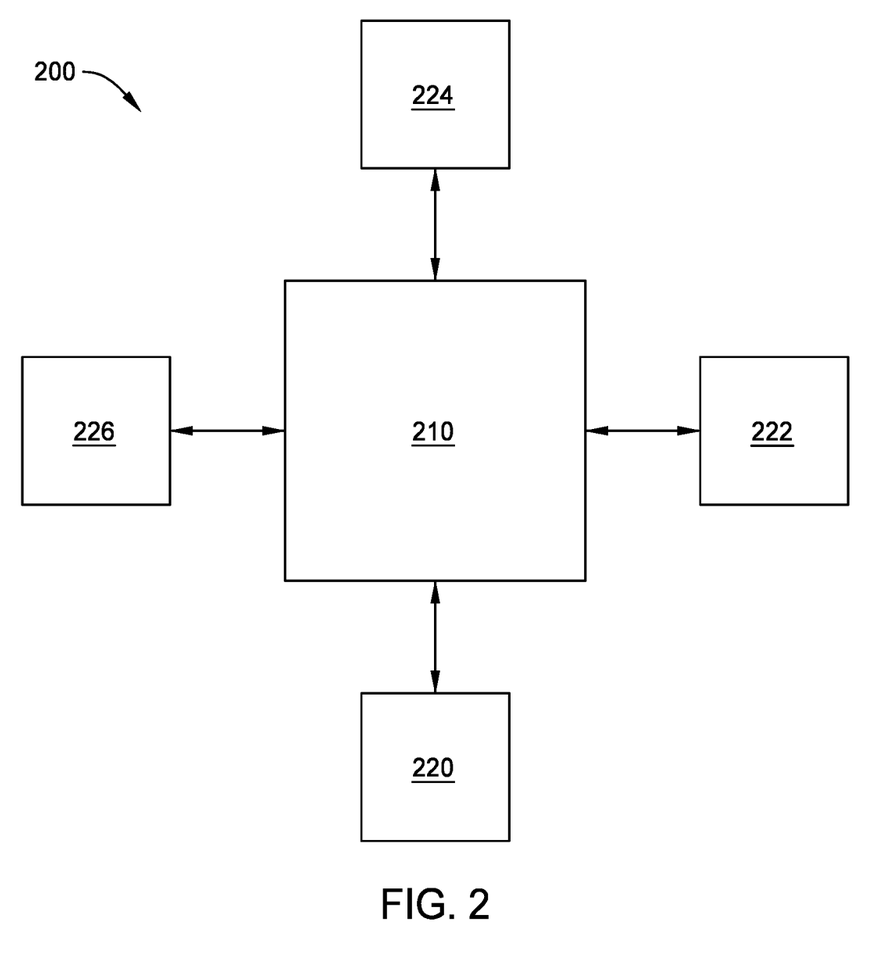
FIG. 2 is a block diagram depicting an example multi-chip system, according to an example.

FIG. 2 illustrates a multi-chip system 200, according to one or more examples. The multi-chip system 200 includes an IC chip 210 connected to IC chips 220-226. The IC chip 210 is configured similar to the main IC chip 110 of FIG. 1. Further, the IC chips 220-226 are configured similar to the auxiliary IC chip 120 of FIG. 1. While four IC chips 220-226 are illustrated in FIG. 2, in other examples the number of IC chips 220-226 may be greater than or less than four.

The IC chip 210 includes sets of transmitter circuitry, receiver circuitry, and interface circuitry for each connected IC chip 220-226. The transmitter circuitry, receiver circuitry, and interface circuitry is configured similar to that of the transmitter circuitry 112, the receiver circuitry 114, and the interface circuitry 116 of FIG. 1. Further, the IC chip 210 is connected to each IC chip 220-226 via one or more channels. The channels are configured similar to the channels 132 and 134 of FIG. 1. In the example of FIG. 2, the IC chip 210 includes at least four sets of transmitter circuitry, receiver circuitry, and interface circuitry.

Each of the IC chips 222-226 transmits to and receives data words from the IC chip 210. Each of the IC chips 222-226 includes transmitter circuitry, receiver circuitry, and interface circuitry similar to that of the transmitter circuitry 122, the receiver circuitry 124, and the interface circuitry 126 as described above with regard to FIG. 1.

Figure 3:
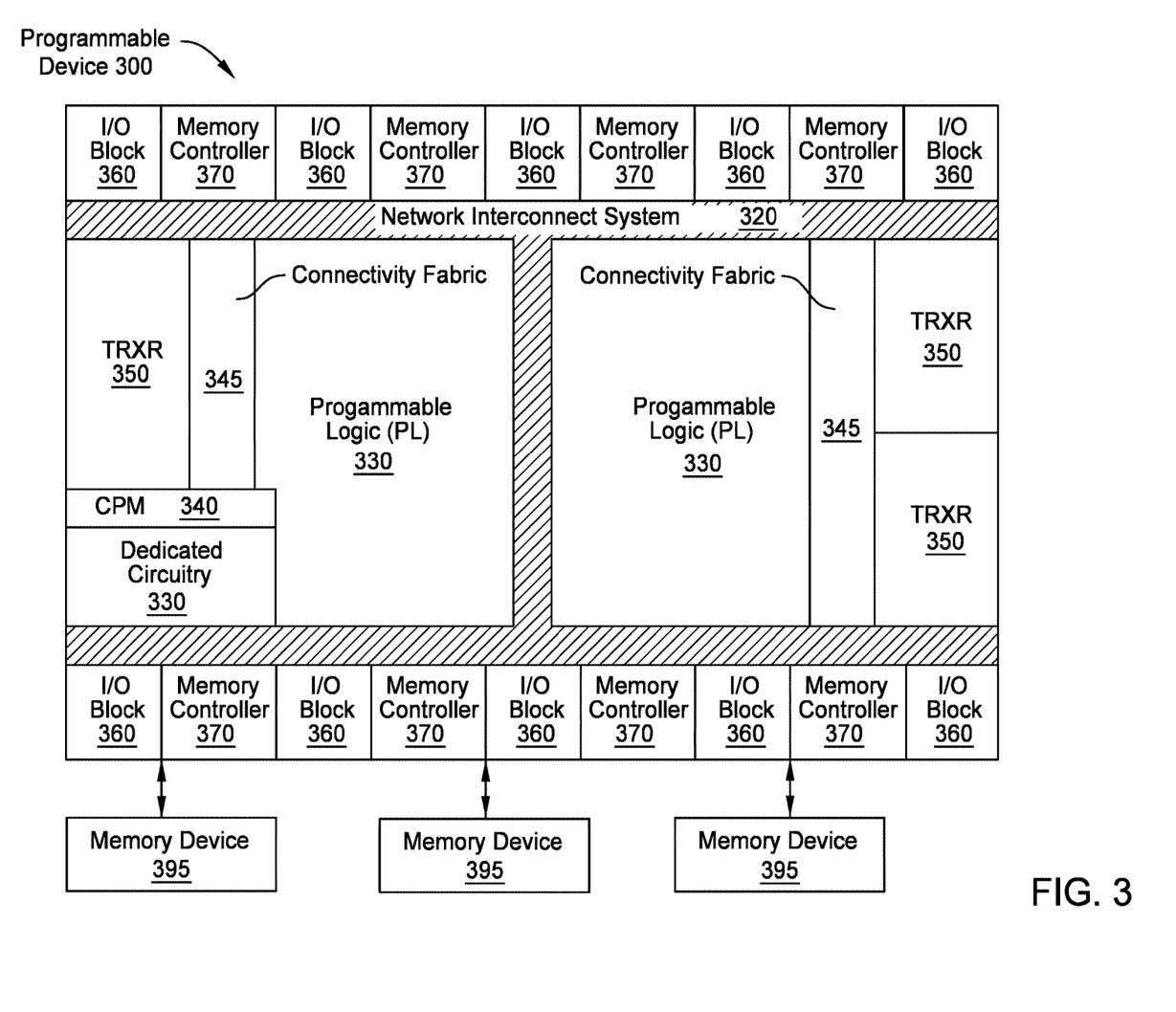
FIG. 3 is a block diagram depicting an example programmable device, according to an example.

FIG. 3 shows a block diagram of an example programmable device 300 within which aspects of the present disclosure may be implemented. The programmable device 300 shown in FIG. 3 is an illustrative example of programmable devices; other implementations with additional or fewer blocks or modules, in a similar or different arrangement, are possible. In one example, the programmable device 300 may be formed on a single IC chip. In another example, the programmable device 300 may be distributed across more than one IC chip. Further, the programmable device 300 may be a System-on-a-Chip (SoC) including a number of subsystems capable of interacting with one another.

The programmable device 300 may include a number of subsystems such as, for example, programmable logic (PL) 310, a network-on-chip (NoC) interconnect system 320, dedicated circuitry 330, a CCIX and PCIe Module (CPM) 340, connectivity fabric 345, transceivers 350, input/output (I/O) blocks 360, and memory controllers 370. The programmable device 300 may include other subsystems or components not shown in FIG. 3. Further, although not shown for simplicity, the programmable device 300 may be coupled to a number of peripheral components (such as one or more high-performance memory devices 395) and/or other devices or chips (such as another programmable device).

The PL 310 includes circuitry that may be programmed to perform a number of different user-defined functions or operations. The PL 310 may include an array of programmable circuit blocks or tiles each including programmable interconnect circuitry and programmable logic circuitry. The programmable circuit blocks may include (but are not limited to) configurable logic blocks (CLBs), random access memory blocks (BRAM), digital signal processing blocks (DSPs), clock managers, delay lock loops (DLLs), and/or other logic or circuits that can be programmed or configured to implement a user-specified circuit design. In addition, or in the alternative, the PL 310 may include a number of input/output blocks (IOBs). The PL 310 is an array of programmable fabric sub-regions (FSRs) that can be distributed across the programmable fabric. In some examples, the FSRs are as repeatable tiles within the programmable fabric.

The programmable interconnect circuitry may include a plurality of interconnect wires of varying lengths interconnected by programmable interconnect points (PIPs). The interconnect wires may be configured to provide connectivity between components within a particular programmable tile, between components within different programmable tiles, and between components of a programmable tile and other subsystems or devices. The programmable interconnect circuitry and the programmable circuit blocks may be programmed or configured by loading configuration data into configuration registers that define how the programmable elements implement a corresponding user-specified circuit design. In some aspects, the programmable interconnect circuitry within each of a number of the programmable circuit blocks may form part of a programmable interconnect fabric that provides block-level and/or device-level signal routing resources for the programmable device 300.

Each CLB may include look-up tables (LUTs), flip-flops, combinational logic, and/or programmable interconnect circuitry that can be collectively programmed by the configuration data to perform various logic functions (such as addition and subtraction) on input signals of varying widths. The LUTs may be of any suitable size, and may include any suitable number of inputs and outputs. In some aspects, each CLB may include 32 LUTs and 64 flip-flops. Each of the CLBs may also include arithmetic carry logic and multiplexers that can be used to implement wider logic functions. The resources of the PL 310 are repeatable tiles arranged in columns in the programmable device 300, and may be divided into a number of regions of a fixed height and width. For the example of FIG. 3, the PL 310 is depicted as occupying different regions of the programmable device 300. In other examples, the PL 310 is a unified region of programmable fabric.

The NoC interconnect system 320, which may be fabricated as part of the programmable device 300, provides a high-speed, high-bandwidth programmable signal routing network that may selectively interconnect the various resources, subsystems, circuits, and other components of the programmable device 300. The NoC interconnect system 320 may extend in the horizontal and vertical directions across the programmable fabric (e.g., towards the edges) of the programmable device 300, as shown in FIG. 3. In addition, or in the alternative, the NoC interconnect system 320 may extend in one or more diagonal directions across the programmable fabric. Further, although shown in the example of FIG. 3 as having a single columnar portion, in other examples, the NoC interconnect system 320 may include a plurality of columnar portions extending vertically across the height of the programmable fabric. Thus, the particular layout, shape, size, orientation, and other physical characteristics of the example NoC interconnect system 320 are merely illustrative of the various examples disclosed herein.

The NoC interconnect system 320 employs a data packet protocol and memory-mapped addresses to route information between the various resources, subsystems, circuits, and other components of the programmable device 300 as packetized data. The data packets may include source addresses, destination addresses, and protocol information that can be used by the NoC interconnect system 320 to route the data packets to their indicated destinations. The data packets may include Quality-of-Service (QoS) information that allows the transmission of data packets through the NoC interconnect system 320 to be prioritized, for example, based on assigned priorities, traffic types, and/or flow information. In such examples, the NoC interconnect system 320 may include priority logic that can determine priority levels or traffic classes of received data packets, and use the determined priority levels or traffic classes when queuing the data packets for transmission.

Although not shown for simplicity, the NoC interconnect system 320 may also include a scheduler and arbitration logic. The scheduler may be used to schedule the transmission of data packets from a source address to a destination address using one or more physical and/or virtual channels of the NoC interconnect system 320. The arbitration logic may be used to arbitrate access to the NoC interconnect system 320, for example, to minimize collisions and other contention-related latencies. For examples in which the programmable device 300 is fabricated using stacked silicon interconnect (SSI) technology, the columnal portions of the NoC interconnect system 320 may provide signal connections between adjacent super logic regions (SLRs), for example, to allow configuration data to be routed between master and slave SLRs.

The NoC interconnect system 320 may include a plurality of nodes, ports, or other interfaces (not shown for simplicity) that provide selective connectivity between the NoC interconnect system 320 and the various resources, subsystems, circuits, and other components of the programmable device 300. For example, the NoC interconnect system 320 may allow multiple subsystems of the programmable device 300 to share access to on-chip memory (OCM) resources, processing resources, and/or I/O resources. By selectively interconnecting the various resources, subsystems, circuits, and other components of the programmable device 300 that can demand and use large amounts of data, the NoC interconnect system 320 may alleviate signal routing burdens on local interconnect resources, thereby increasing device performance and allowing for greater configuration flexibility than other programmable devices. Moreover, by providing a high-performance signal routing network having higher data transmission rates and lower error rates than device-level and block-level programmable interconnects, the NoC interconnect system 320 may increase the processing power and data throughput of the programmable device 300 (as compared to other programmable devices). In one example, the NoC interconnect system 320 employs a DBI process as described above with regard to FIG. 1 and FIG. 2. For example, the NoC interconnect system 320 determines whether or not to invert the current data word based on the previous data word before transmitting the current data word, as is described above with regards to FIG. 1 and FIG. 2.

The dedicated circuitry 330 may include any suitable hard-wired circuits including (but not limited to) processors, serial transceivers, digital signal processors (DSPs), analog-to-digital converters (ADCs), digital-to-analog converters (DACs), device management resources, device monitoring resources, device testing management resources, and so on. The dedicated circuitry 330 may include a processing system (PS) and a platform management controller (PMC). The PS may include a number of processor cores, cache memory, and unidirectional and/or bidirectional interfaces configurable to couple directly to the I/O pins of the programmable device 300. In some aspects, each processor core may include central processing units (CPU) or scalar processors that can be used for sequential data processing. The PMC may be used for booting and configuring the programmable device 300 based on configuration data (such as a configuration bitstream) provided from external memory. The PMC may also be used to configure the PL 310 and to control various encryption, authentication, system monitoring, and debug capabilities of the programmable device 300.

The CCIX and PCIe module (CPM) 340 may include a number of interfaces that provide connectivity between the programmable device 300 and a number of peripheral components (such as external devices or chips). The CPM 340 may include a number of peripheral interconnect express (PCIe) interfaces and cache coherent interconnect for accelerators (CCIX) interfaces that provide connectivity to other devices or chips via the transceivers 350. In some aspects, the PCIe and CCIX interfaces are part of the transceivers 350.

The programmable interconnect fabric (not shown for simplicity) may provide block-level and/or device-level signal routing resources that can selectively interconnect circuits and subsystems in nearby regions of the programmable fabric based on configuration data loaded into corresponding configuration registers. The programmable interconnect fabric may include a plurality of fabric sub-regions (FSRs) include repeatable tiles and distributed across the programmable device 300. In some aspects, the FSRs may include portions of the programmable interconnect elements associated with the various programmable logic circuits (such as CLBs, DSPs, and BRAM) of the PL 310.

The transceivers 350 may provide signal connections with one or more other devices or chips (not shown for simplicity) connected to the programmable device 300. The transceivers 350 may include a number of different SERDES such as, for example, gigabit serial transceivers. The transceivers 350 include a number of repeatable tiles positioned in various locations along the right and left sides of the programmable device 300, as depicted in FIG. 3. In other examples, the transceivers 350 may be positioned in other suitable locations of the programmable device 300.

The I/O blocks 360 are coupled to the device's I/O pins (not shown for simplicity), and may provide I/O capabilities for the programmable device 300. For example, the I/O blocks 360 may receive data from one or more other devices, and may drive the received data to a number of destinations in the programmable device 300. The I/O blocks 360 may also receive data from a number of sources in the programmable device 300, and may drive the received data to one or more other devices via the device's I/O pins. The I/O blocks 360 include repeatable tiles. The programmable device 300 may include any suitable number of I/O blocks 360, and therefore the example depicted in FIG. 3 is merely illustrative.

The I/O blocks 360 may include any number of suitable I/O circuits or devices. The I/O blocks 360 may include extremely high-performance I/O (XPIO) circuits, high-density I/O (HDIO) circuits, and multiplexed I/O (MIO) circuits. The XPIO circuits may be optimized for high-performance communications such as providing a high-speed, low latency interface to the memory controllers 370. The HDIO circuits may provide a cost-effective solution that supports lower speed and higher voltage I/O capabilities (as compared with the XPIO circuits). The MIO circuits may provide general-purpose I/O resources that can be accessed by various subsystems such as, for example, the PL 310, the dedicated circuitry 330, and the CPM 340.

A first row of I/O blocks 360 include repeatable tiles positioned along a bottom edge of the programmable device 300, and a second row of I/O blocks 360 include repeatable tiles positioned along a top edge of the programmable device 300. In some aspects, the repeatable tiles of the I/O blocks 360 may be different from one another. For example, some I/O blocks 360 are XPIO circuits, other I/O blocks 360 are HDIO circuits, and other I/O blocks 360 are MIO circuits.

The memory controllers 370 may be used to control access to various memory resources provided within and/or external to the programmable device 300. The memory controllers 370 may include double data rate v4 (DDR4) memory controllers, double data rate v5 (DDR5) memory controllers, high bandwidth memory (HBM) controllers, and/or other suitable memory controllers. Some or all of the memory controllers 370 may include a scheduler having transaction reordering capabilities that may improve memory access efficiency.

A first row of memory controllers 370 include repeatable tiles positioned along the bottom edge of the programmable device 300, and a second row of memory controllers 370 include repeatable tiles positioned along the top edge of the programmable device 300. In some aspects, the repeatable tiles of the memory controllers 370 may be different from one another. For example, a first number of the memory controllers 370 are DDR4 memory controllers, a second number of the memory controllers 370 are LPDDR4 memory controllers, and a third number of the memory controllers 370 are HBM controllers. The repeatable tiles of the I/O blocks 360 and memory controllers 370 may be alternately positioned or distributed relative to each other, for example, as depicted in the example of FIG. 3. The programmable device 300 may include any number of the I/O blocks 360 and memory controllers 370, and therefore the numbers and positions of the I/O blocks 360 and memory controllers 370 depicted in FIG. 3 are merely illustrative.

Although not shown in FIG. 3 for simplicity, the programmable device 300 may include a Boundary Logic Interface (BLI) that provides connectivity between the I/O blocks 360 and programmable interconnects provided within the PL 310. In some aspects, the BLI may allow large and complex external devices (such as HBM) to appear as much smaller blocks (such as a CLB) in the programmable fabric of the programmable device 300. The BLI may be arranged in rows positioned at the top and bottom boundaries or edges of the programmable fabric. In this manner, the BLI may be used to route signals between columnar logic structures (such as a CLB column or a DSP column) and rows of I/O resources (such as the I/O blocks 360).

In various example, employing the DBI process as described above ensures that less than 50 percent of the bits of a transmitted data word are inverted with reference to the previously transmitted data word. However, in interfaces that use high data rates, errors may still occur. Accordingly, further reducing the number of bit inversions between data words reduces the BER of an interface, further reducing errors that occur when communicating over the interface.

Figure 4:
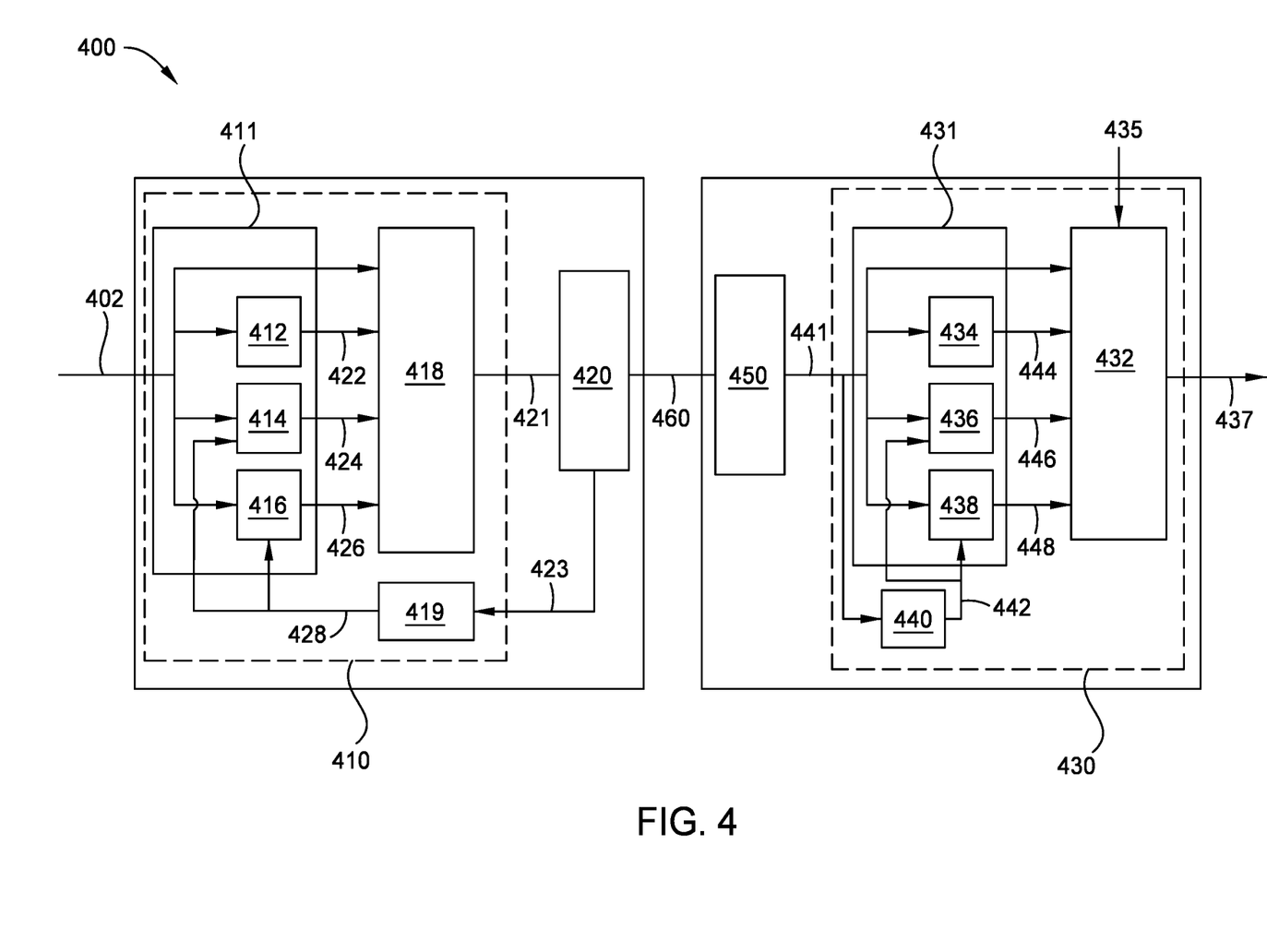
FIG. 4 is a block diagram of an example interface system, according to an example.

FIG. 4 illustrates example interface system 400, according to one or more examples. The interface system 400 may be configured similar to the interface 130 of FIG. 1 or the NoC interconnect system 320 of FIG. 3. For example, the interface system 400 is implemented to communicate between IC chips similar to that of the interface 130 of FIG. 1. In other example, the interface system 400 is implemented to communicate between elements of a programmable device similar to that of the NoC interconnect system 320 of FIG. 3.

The interface system 400 includes transmitter circuitry 410, interface circuitry 420, receiver circuitry 430, interface circuitry 450, and channel 460. The transmitter circuitry 410 communicates with the receiver circuitry 430 via the interface circuitry 420, the channel 460, and the interface circuitry 450. In one example, the interface circuitry 420 and 440 may be omitted and the transmitter circuitry 410 communicates directly with the receiver circuitry 430 via the channel 460. Further, the transmitter circuitry 410 and/or the receiver circuitry 430 are part of transceiver circuitry.

The transmitter circuitry 410, the interface circuitry 420, the interface circuitry 450, and the receiver circuitry 430 are part of a single IC chip or multiple IC chips. In one example, the transmitter circuitry 410, the interface circuitry 420, the interface circuitry 450, and the receiver circuitry 430 may be part of a programmable device, e.g., the programmable device 300 of FIG. 3. In another example, the transmitter circuitry 410 and the interface circuitry 420 are part of a first IC chip (e.g., the main IC chip 110 of FIG. 1), and the interface circuitry 450, and the receiver circuitry 430 are part of a second IC chip (e.g., the auxiliary IC chip 120 of FIG. 1).

The transmitter circuitry 410 includes processing circuitry 411, selection circuitry 418, and memory 419. The processing circuitry 411 receives the data word 402 and outputs the data word 402, a transformed data word 422 and one or more transform data words 424 and 426. The processing circuitry 411 generates the transformed data word 422 by inverting the value of each bit the data word 402. Further, the processing circuitry 411 generates the transform data words 424 and 426 by performing a corresponding invertible transform operation on the data word 402 and the previous data word 428. The invertible transform operation includes a bitwise XOR operation and a bitwise XNOR operation, among others. The previous data word 428 is a data word that is transmitted during a period before the data word 402. In another embodiment, the previous data word 428 is a data word that is transmitted immediately before the data word 402.

The selection circuitry 418 receives the data word 402, the transformed data word 422, the transform data word 424, and the transform data word 426 from the processing circuitry 411. The selection circuitry 418 compares the bits of each of the data word 402, the transformed data word 422, the transform data word 424, and the transform data word 426 to the bits of the previous data word 428. The selection circuitry 418 determines which of the data word 402, the transformed data word 422, the transform data word 424, and the transform data word 426 has the least number of bits that toggle (e.g., invert) in value from the bits of the previous data word 428. The selection circuitry 418 outputs the selected one of the data word 402, the transformed data word 422, the transform data word 424, and the transform data word 426 as the data word 421 to the interface circuitry 420 and the interface circuitry outputs the data word 421 as the data word 423 via the channel 460.

The selection circuitry 418 includes one or more multiplexers and processor that select a data word to output from the data words 402, 422, 424, and 426 and determine which of the data words 402, 422, 424, and 426 is associated with the smallest number of bit inversions with reference to the previous data word 428.

The processing circuitry 411 includes inversion circuitry 412, transform circuitry 414, and transform circuitry 416. In one example, one of the transform circuitry 414 and 416 is omitted or an additional one or more transform circuitries are included within the processing circuitry 411. In embodiments where one of the transform circuitry 414 and 416 is omitted, the corresponding transformed data word 424 and 426 is omitted and not received and processed by the selection circuitry 418.

The inversion circuitry 412 generates the transformed data word 422 by inverting (e.g., toggling) the value of each bit of the data word 402. For example, the inversion circuitry 412 inverts each bit of the data word 402 from a first value (e.g., 0 or 1) to a second value (e.g., 1 or 0). In one example, the inversion circuitry 412 includes an inverted buffer and other circuit elements.

The transform circuitry 414 performs an invertible transform on the data word 402 and the previous data word 428. An invertible transform is a transform that generates an output that can be inverted to recover the original input (e.g., data word). In one example, the transform circuitry 414 performs a bitwise XOR operation on the data word 402 and the previous data word 428. The input to the bitwise XOR operation is the bits of the data word 402 and the bits of the previous data word 428. The bitwise XOR operation compares each bit of the data word 402 to a corresponding bit of the data word 428 to determine the bits of the transform data word 424. For example, when a bit of the data word 402 and a bit of the previous data word 428 have a different value (e.g., 0 and 0 or 1 and 1), the bit of the transform data word 424 has a value of 1. Further, when a bit of the data word 402 and a bit of the previous data word 428 has the same value (e.g., 0 or 1), the bit of the transform data word 424 has a value of 0. In one example, the transform circuitry 414 includes an XOR logic gate and other circuit elements.

The transform circuitry 416 performs an invertible transform on the data word 402 and the previous data word 428. The invertible transform performed by the transform circuitry 416 differs from that of the transform circuitry 414. In one example, the transform circuitry 416 performs a bitwise XNOR operation on the data word 402 and the previous data word 428. The input to the bitwise XNOR operation is the bits of the data word 402 and the bits of the previous data word 428. The bitwise XNOR operation compares each bit of the data word 402 to a corresponding bit of the data word 428 to determine the bits of the transform data word 426. For example, when a bit of the data word 402 and a bit of the previous data word 428 have the same value (e.g., 0 and 0, or 1 and 1), the bit of the transform data word 426 has a value of 1. Further, when a bit of the data word 402 and a bit of the previous data word 428 have a different value (e.g., 0 or 1), the bit of the transform data word 426 has a value of 0.

At least two of the inversion circuitry 412, the transform circuitry 414, and the transform circuitry 416 generate the corresponding transformed data word 422, 424, and 426 during at least partially overlapping periods. In another example, the transform circuitry 414, and the transform circuitry 416 generate the corresponding transformed data word 422, 424, and 426 during non-overlapping periods.

The memory 419 stores the data word 423 and outputs the previous data word 428 to the transform circuitry 414 and the transform circuitry 416. The previous data word 428 is the data word transmitted during a previous period.

The receiver circuitry 430 includes processing circuitry 431, the selection circuitry 432, and the memory 440. The processing circuitry 411 receives the data word 441 and outputs the data words 441, 444, 446, and 448.

The processing circuitry 411 generates the data word 444 by inverting the value of each bit the data word 441. Further, the processing circuitry 411 generates the transform data word 446 and 448 by performing a corresponding invertible transform operation on the data word 441 and the previous data word 442. The invertible transform operation includes a bitwise XOR operation and a bitwise XNOR operation, among others. The invertible transform performed to generate the data word 446 is the same as the invertible transform performed to generate the transformed data word 424. The invertible transform performed to generate the data word 448 is the same as the invertible transform performed to generate the transformed data word 426.

The selection circuitry 432 receives the data words 441, 444, 446, and 448 and selects one of the data words 441, 444, 446, and 448 to be output as the data word 437. In one example, the selection circuitry 432 receives the data words 441, 444, 446, and 448 and selects one of the data words 441, 444, 446, and 448 based on the operation performed by the transmitter circuitry 410 when outputting the data word 423. In one example, the selection circuitry 432 receives a control signal 435 that indicates which of the data words 441, 444, 446, and 448 to select. The control signal 435 indicates if the data word 423 was transformed and which transform was applied to the data word before it was transmitted. For example, the control signal 435 indicates if the data word 423 was not transformed (e.g., the data word 423 is the data word 402), was inverted (e.g., the data word 423 is the transformed data word 422), or transformed with an invertible transform (e.g., the data word 423 is the transformed data word 424 or 426). The selected data word 441, 444, 446, or 448 is output as data word 437.

The selection circuitry 432 includes one or more multiplexers that select a data word to output from the data words 441, 444, 446, and 448.

The processing circuitry 431 includes inversion circuitry 434, transform circuitry 436, and transform circuitry 438. In one example, one of the transform circuitry 436 and the transform circuitry 438 is omitted or an additional one or more transform circuitries are included within the processing circuitry 431.

The inversion circuitry 434 generates the data word 444 by inverting (e.g., toggling) the value of each bit of the data word 441. For example, the inversion circuitry 434 inverts each bit of the data word 441 having a value of one to a value of zero and each bit having a value of zero to a value of one. The inversion circuitry 434 includes an inverted buffer and other circuit elements.

The transform circuitry 436 performs an invertible transform on the data word 441 and the previous data word 442. The invertible transform performed by the transform circuitry 438 is the same that performed by the transform circuitry 416. In one example, the transform circuitry 414 performs a bitwise XOR operation on the data word 441 and the previous data word 442. The input to the bitwise XOR operation is the bits of the data word 441 and the bits of the previous data word 442. The bitwise XOR operation compares each bit of the data word 441 to a corresponding bit of the previous data word 442 to determine the bits of the transform data word 444. For example, when a bit of the data word 441 and a bit of the previous data word 442 have a different value (e.g., 0 and 1), the bit of the transform data word 444 has a value of 1. Further, when a bit of the data word 441 and a bit of the previous data word 442 has the same value (e.g., 0 and 0, or 1 and 1), the bit of the transform data word 424 has a value of 0. The transform circuitry 436 includes XOR logic and other circuit elements.

The transform circuitry 438 performs an invertible transform on the data word 441 and the previous data word 442. The invertible transform performed by the transform circuitry 438 differs from that of the transform circuitry 436. The invertible transform performed by the transform circuitry 438 is the same as that performed by the transform circuitry 416. In one example, the transform circuitry 438 performs a bitwise XNOR operation on the data word 441 and the previous data word 442. The input to the bitwise XNOR operation is the bits of the data word 441 and the bits of the previous data word 442. The bitwise XNOR operation compares each bit of the data word 441 to a corresponding bit of the previous data word 442 to determine the bits of the transform data word 426. For example, when a bit of the data word 441 and a bit of the previous data word 442 have the same value (e.g., 0 and 0, or 1 and 1), the bit of the transform data word 448 has a value of 1. Further, when a bit of the data word 441 and a bit of the previous data word 442 have a different value (e.g., 0 and 1), the bit of the transform data word 448 has a value of 0.

In one example, each of the inversion circuitry 434, the transform circuitry 436, and the transform circuitry 438 process each received data word to generate a corresponding data word 444, 446, and 448. In another example, one of the inversion circuitry 434, the transform circuitry 436, and the transform circuitry 438 processes the data word 441 to determine a respective one of the data words 444, 446, and 448. For example, the one of the inversion circuitry 434, the transform circuitry 436, and the transform circuitry 438 corresponding to the transform technique applied the processing circuitry 411 is used to generate a respective data word 444, 446, and 448. Further, at least two of the inversion circuitry 434, the transform circuitry 436, and the transform circuitry 438 process the data word 441 during at least partially overlapping periods. In another example, the inversion circuitry 434, the transform circuitry 436, and the transform circuitry 438 process the data word 441 during non-overlapping periods.

The memory 419 stores the data word 441 and outputs previous data word 442 to the transform circuitry 414 and the transform circuitry 416. In one example, the previous data word 442 is the data word received during a period before the data word 423 is received. The previous data word 442 may be received during a period immediately before the period during which the data word 423 is received. Further, the previous data word 442 is the same as the previous data word 428.

As compared to a DBI process that uses a non-inverted data word and an invited data word, the above DBI process additionally uses one or more transformed data words. The use of the transformed data words further reduces the number of bits that are toggled (inverted) between a current data word a previous data word. In an example where the bits of the current data word are 111111111 and the bits of a previous data word are 000001111, the first five bits of the current data word differ from the first five bits of the previous data word, equaling a total of five bits that are toggled between the current data word and the previous data word. Inverting the current data word generates an inverted data word having bits of 000000000. Comparing the transformed data word to the transformed data word indicates that four bits of the transformed data word are toggled from the previous data word. The inverted data word has one less bit that is toggled as compared to the non-inverted current data word. However, applying a bitwise XNOR operation to the current data word and the previous data word generates a transformed data word having the bits 000001111, which is the same as the bits of the previous data word. Accordingly, no bits are toggled when transmitting the transformed data word.

In another example where the bits of the current data word are 000000000 and the bits of a previous data word are 000001111, the last four bits of the current data word differ from the last four bits of the previous data word, equaling a total of four bits that are toggled between the current data word and the previous data word. Inverting the current data word generates an inverted data word having bits of 111111111. Comparing the inverted data word to the previous data word indicates that five bits of the inverted data word are toggled from the previous data word. The inverted data word has one more bit that is toggled as compared to the non-inverted current data word. However, applying a bitwise XOR operation to the current data word and the previous data word generates a transformed data word having the bits 000001111, which is the same as the bits of the previous data word. Accordingly, no bits are toggled when transmitting the transformed data word.

As can be seen from the above examples, employing a DBI process that includes invertible transform operations (e.g., a bitwise XOR operation and/or a bitwise XNOR operation, among other), decreases the number of bits that toggle when transmitting a data word with reference to a previous data word. Accordingly, as the number of bits that toggle are reduced, the errors that occur when communicating over a corresponding interface system are further mitigated.

Figure 5:
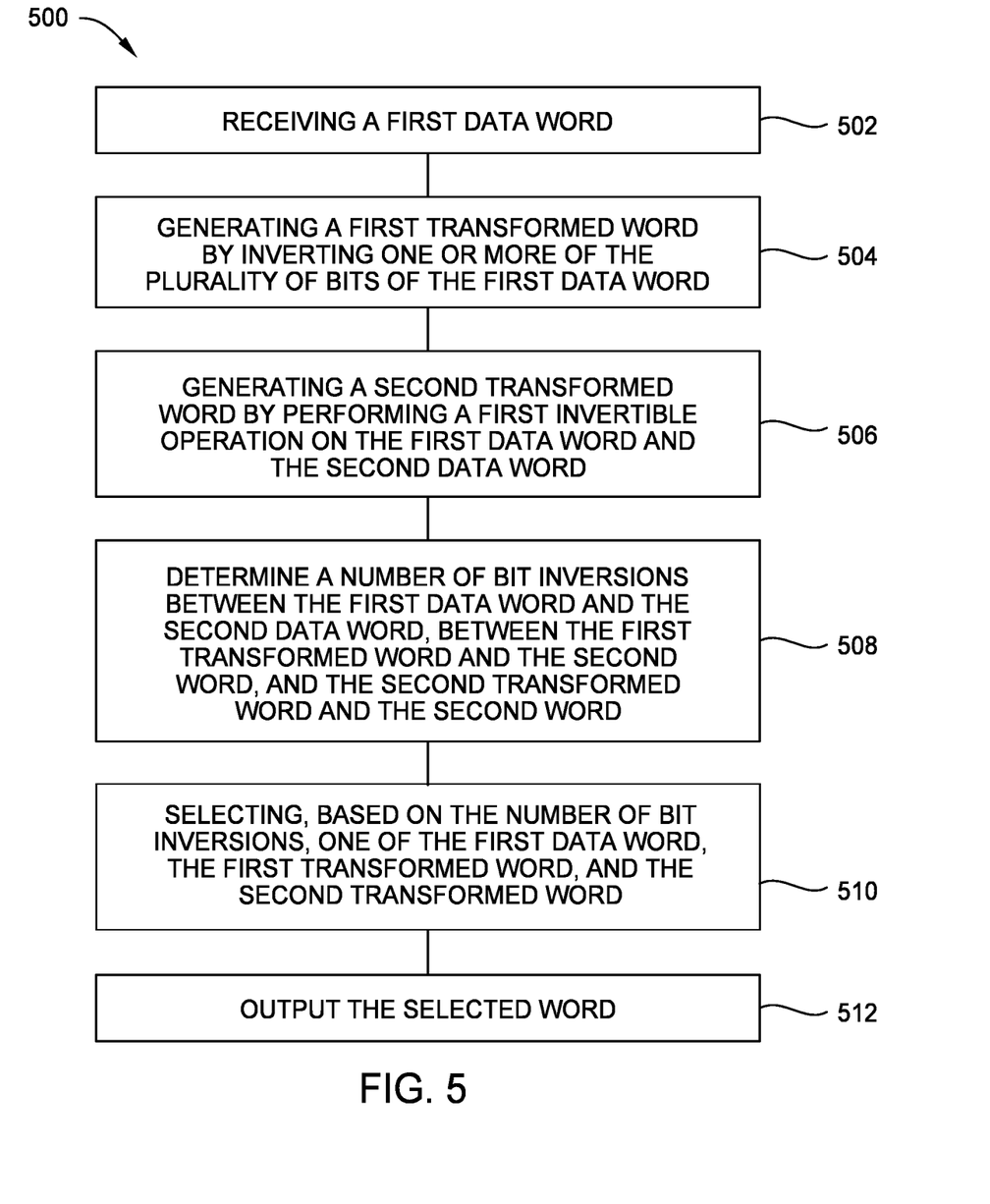
FIG. 5 illustrates a flow chart of a method for transmitting a data word, according to an example.

FIG. 5 illustrates a flowchart of a method 500 for outputting a data word, according to one or more examples. The method 500 is described with reference to FIG. 4. At block 502 a data word is received by processing circuitry of transmitter circuitry. In one example, the data word 402 is received by the processing circuitry 411.

At block 504, a first transformed data word is generated by inverting one or more of the plurality of bits of the first data word. For example, the bits of the data word 402 are inverted by the inversion circuitry 412 to generate the transformed data word 422.

At block 506, a second transformed data word is generated by performing a first invertible operation on the first data word and a second data. The second data word is a previously transmitted data word. The second data word may be a data word transmitted during a period immediately before that of the first data word. In one example, if the first data word is to be transmitted during period N, the second data word was transmitted during period N−1. The invertible transform is a bitwise XOR operation or a bitwise XNOR operation. In one example, the bits of the data word 402 and the bits of the previous data word 428 are transformed by the transform circuitry 414 to generate the transformed data word 424. The transform circuitry 414 or the transform circuitry 414 performs an invertible transform on the data word 402 and the previous data word 428 to generate the transformed data word 424. In one example, the transform circuitry 414 performs a bitwise XOR operation on the data word 402 and the previous data word 428 to generate the transformed data word 424. In another example, the transform circuitry 416 performs a bitwise XNOR operation on the data word 402 and the previous data word 428 to generate the transformed data word 426.

At block 508, a first number of bit inversions between the first data word and the second data word is determined, a second number of bit inversions between the first transformed data word and the second data word is determined, and a third number of bit inversions between the second transformed data word and the second data word is determined. The selection circuitry 418 compares the values of the bits of the data word 402 to the values of the previous data word 428 to determine the number of bits that toggle in value (e.g., bit inversions) between the data word 402 and the previous data word 428. Further, selection circuitry 418 compares the values of the bits of the transformed data word 422 to the values of the previous data word 428 to determine the number of bits that toggle in value (e.g., bit inversions) between the transformed data word 422 and the previous data word 428. The selection circuitry 418 further compares the values of the bits of the transformed data word 424 or 426 to the values of the previous data word 428 to determine the number of bits that toggle in value (e.g., bit inversions) between the transformed data word 424 and the previous data word 428.

At block 510, the first data word, the first transformed data word, or the second transformed data word is selected based on the first, second, and third number of transitions. For example, the selection circuitry 418 selects one of the data word 402, the transformed data word 422, and the transformed data word 424 or 426 based on the corresponding number of bit inversions determined at block 508. The selection circuitry 418 selects the data word 402 based on the number of bit inversions corresponding to the data word 402 determined at block 508 being less than the number of bit inversions corresponding to the transformed data word 422 and the transformed data word 424 or 426 determined at block 508. The selection circuitry 418 selects the transformed data word 422 based on the number of bit inversions corresponding to the transformed data word 422 determined at block 508 being less than the number of bit inversions corresponding to the data word 402 and the transformed data word 424 or 426 determined at block 508. Further, the selection circuitry 418 selects the transformed data word 424 or 426 based on the number of bit inversions corresponding to the transformed data word 424 or 426 determined at block 508 being less than the number of bit inversions corresponding to the data word 402 and the transformed data word 422 determined at block 508.

In one example, the selection circuitry 418 outputs an indication signal indicating which data word was selected. The indication signal may additionally, or alternatively, indicate whether a transform process was applied to the data word and which transform process was applied to the data word.

At block 512, the selected data word is output. For example, the selection circuitry 418 outputs the data word 421 to the interface circuitry 420, and the interface circuitry 420 outputs the data word 423 to the receiver circuitry 430 via the channel 460 and the interface circuitry 450.

As is discussed in the above disclosure, limiting the number of bit inversions between a current data word and a previously transmitted data word mitigates errors in the transmission process, reducing the bit error rate of the interface. To reduce the number of bit inversions, one or more invertible operations are employed and applied to a current data word and a previously transmitted data word. The one or more invertible operations include a bitwise XOR operation, and a bitwise XNOR operation, among others. An invertible operation is applied to the current data word and the previous data word to generate a transformed data word. The data word (e.g., non-transformed data word or transformed data words) having the smallest number of bit inversions from the previous data word is selected and transmitted, reducing the bit error rate of the corresponding interface system.

While the foregoing is directed to specific examples, other and further examples may be devised without departing from the basic scope thereof, and the scope thereof is determined by the claims that follow.

What is claimed is:

1. A transmitter circuitry comprising:
   inversion circuitry configured to generate a first transformed data word by inverting one or more of a plurality of bits of a first data word;
   first transform circuitry configured to generate a second transformed data word by performing a first invertible operation on the first data word and a second data word; and
   selection circuitry configured to:
      select one of the first data word, the first transformed data word, and the second transformed data word based on a first number of bit inversions between the first data word and the second data word, a second number of bit inversions between the first transformed data word and the second data word, and a third number of bit inversions between the second transformed data word and the second data word; and
      output the selected data word.

2. The transmitter circuitry of claim 1, wherein the first invertible operation is a bitwise XOR operation.

3. The transmitter circuitry of claim 1 further comprising second transform circuitry configured to generate a third transformed data word by performing a second invertible operation on the first data word and the second data word, wherein the second invertible operation differs from the first invertible operation.

4. The transmitter circuitry of claim 3, wherein the second invertible operation is a bitwise XNOR operation.

5. The transmitter circuitry of claim 1, wherein the selection circuitry is further configured to:
   determine the first number of bit inversions between the first data word and the second data word, the second number of bit inversions between the first transformed data word and the second data word, and the third number of bit inversions between the second transformed data word and the second data word.

6. The transmitter circuitry of claim 1, wherein selecting the one of the first data word, the first transformed data word, and the second transformed data word comprises:
   selecting the first data word based on the first number of bit inversions being less than the second number of bit inversions and the third number of bit inversions;
   selecting the first transformed data word based on the second number of bit inversions being less than the first number of bit inversions and the third number of bit inversions; and
   selecting the second transformed data word based on the third number of bit inversions being less than the first number of bit inversions and the second number of bit inversions.

7. The transmitter circuitry of claim 1 further comprising a memory configured to store and output the second data word.

8. An electronic device comprising:
   transmitter circuitry configured to receive a first data word comprising a plurality of bits, the transmitter circuitry comprising:
      inversion circuitry configured to generate a first transformed data word by inverting one or more of the plurality of bits of the first data word;
      first transform circuitry configured to generate a second transformed data word by performing a first invertible operation on the first data word and a second data word; and
      selection circuitry configured to:
         select one of the first data word, the first transformed data word, and the second transformed data word based on a first number of bit inversions between the first data word and the second data word, a second number of bit inversions between the first transformed data word and the second data word, and a third number of bit inversions between the second transformed data word and the second data word, wherein the transmitter circuitry is configured to output the selected data word.

9. The electronic device of claim 8, wherein the first invertible operation is a bitwise XOR operation.

10. The electronic device of claim 8, wherein the transmitter circuitry is further configured to:
    generate a third transformed data word by performing a second invertible operation on the first data word and the second data word, wherein the second invertible operation differs from the first invertible operation.

11. The electronic device of claim 10, wherein the second invertible operation is a bitwise XNOR operation.

12. The electronic device of claim 8, wherein the selection circuitry is further configured to:
    determine the first number of bit inversions between the first data word and the second data word, the second number of bit inversions between the first transformed data word and the second data word, and the third number of bit inversions between the second transformed data word and the second data word.

13. The electronic device of claim 8, wherein selecting the one of the first data word, the first transformed data word, and the second transformed data word comprises:
    selecting the first data word based on the first number of bit inversions being less than the second number of bit inversions and the third number of bit inversions;
    selecting the first transformed data word based on the second number of bit inversions being less than the first number of bit inversions and the third number of bit inversions; and selecting the second transformed data word based on the third number of bit inversions being less than the first number of bit inversions and the second number of bit inversions.

14. The electronic device of claim 8 further comprising:
receiver circuitry configured to receive the output data word, the receiver circuitry comprising:
processing circuitry configured to:
generate a first received data word by inverting one or more bits of the output data word; and
generate a second received data word based on the first invertible operation, the output data word, and the second data word.

15. A method for transmitting a data word, the method comprising:
receiving, via transmitter circuitry, a first data word comprising a plurality of bits;
generating, via inversion circuitry of the transmitter circuitry, a first transformed data word by inverting one or more of the plurality of bits of the first data word;
generating, via first transform circuitry of the transmitter circuitry, a second transformed data word by performing a first invertible operation on the first data word and a second data word;
selecting, via selection circuitry of the transmitter circuitry, one of the first data word, the first transformed data word, and the second transformed data word based on a first number of bit inversions between the first data word and the second data word, a second number of bit inversions between the first transformed data word and the second data word, and a third number of bit inversions between the second transformed data word and the second data word; and
outputting the selected data word.

16. The method of claim 15, wherein the first invertible operation is a bitwise XOR operation.

17. The method of claim 16 further comprising:
generating a third transformed data word by performing a second invertible operation on the first data word and the second data word, wherein the second invertible operation differs from the first invertible operation.

18. The method of claim 17, wherein the second invertible operation is a bitwise XNOR operation.

19. The method of claim 15, wherein the selecting the one of the first data word, the first transformed data word, and the second transformed data word comprises:
selecting the first data word based on the first number of bit inversions being less than the second number of bit inversions and the third number of bit inversions;
selecting the first transformed data word based on the second number of bit inversions being less than the first number of bit inversions and the third number of bit inversions; and
selecting the second transformed data word based on the third number of bit inversions being less than the first number of bit inversions and the second number of bit inversions.

20. The method of claim 15 further comprising:
receiving the output data word;
generating a first received data word by inverting one or more bits of the output data word; and
generating a second received data word based the first invertible operation, the output data word and the second data word.

* * * * *